(12) United States Patent
Claret et al.

(10) Patent No.: US 8,831,506 B2
(45) Date of Patent: *Sep. 9, 2014

(54) SIGNAL REPEATER AND METHOD FOR MATCHING AN OUTPUT IMPEDANCE OF THE SIGNAL REPEATER, WHICH AMPLIFIES A SIGNAL ON AN ELECTRICAL LINE OF AN ELECTRICAL GRID, TO AN IMPEDANCE OF A LOAD

(71) Applicant: Marvell Hispania, S.L.U., Madrid (ES)

(72) Inventors: Jorge Vicente Blasco Claret, Valencia (ES); Josa Luis Gonzalez Moreno, Xirivella (ES); Jose Luis Camps Soriano, Xirivella (ES); Antonio Pairet Molina, Sagunto (ES)

(73) Assignee: Marvell Hispania, S.L.U., Madrid (ES)

( * ) Notice: Subject to any disclaimer, the term of this patent is extended or adjusted under 35 U.S.C. 154(b) by 0 days.

This patent is subject to a terminal disclaimer.

(21) Appl. No.: 13/795,589

(22) Filed: Mar. 12, 2013

(65) Prior Publication Data
US 2013/0195150 A1   Aug. 1, 2013

Related U.S. Application Data

(63) Continuation of application No. 12/666,646, filed as application No. PCT/ES2008/000417 on Jun. 10, 2008, now Pat. No. 8,396,415.

(30) Foreign Application Priority Data

Jun. 25, 2007   (ES) .................................. 200701761

(51) Int. Cl.
| | |
|---|---|
| *H04B 3/36* | (2006.01) |
| *H04B 7/14* | (2006.01) |
| *H04B 7/15* | (2006.01) |
| *H04B 7/185* | (2006.01) |

(52) U.S. Cl.
USPC ............ 455/7; 455/11.1; 455/12.1; 455/13.1; 455/13.2; 455/13.3

(58) Field of Classification Search
USPC .................. 455/7, 11.1, 12.1, 13.1, 13.2, 13.3
See application file for complete search history.

(56) References Cited

U.S. PATENT DOCUMENTS

| | | | |
|---|---|---|---|
| 3,973,089 A | 8/1976 | Puckette | |
| 6,298,046 B1 | 10/2001 | Thiele | |
| (Continued) | | | |

FOREIGN PATENT DOCUMENTS

| | | |
|---|---|---|
| JP | 62107541 | 5/1987 |
| JP | 2007028270 | 2/2007 |

OTHER PUBLICATIONS

International Search Report of Application No. PCT/ES2008/000417.

*Primary Examiner* — Bobbak Safaipour

(57) ABSTRACT

A signal repeater includes a port, an amplifier, and an adaptive device. The port is configured to connect to an electrical line of an electrical grid between devices. Communication over the electrical line and between the devices includes transmission of a first signal. The port is configured to receive the first signal from the electrical line. An amplifier is configured to receive a second signal based on the first signal, and amplify the second signal. The port is configured to receive the amplified second signal, and provide the amplified second signal to the electrical line. An adaptive device is configured to, based on the first signal, adjust an output impedance of the signal repeater to match a first impedance of a load on the signal repeater. The first impedance is seen by the signal repeater at the port, and wherein the first impedance includes an impedance of the electrical line.

20 Claims, 9 Drawing Sheets

(56) References Cited

U.S. PATENT DOCUMENTS

| | | |
|---|---|---|
| 6,516,062 B1 * | 2/2003 | Yang et al. ............... 379/406.08 |
| 6,598,232 B1 | 7/2003 | McAlear |
| 6,856,684 B1 * | 2/2005 | Straeussnigg ............ 379/406.05 |
| 7,110,732 B2 * | 9/2006 | Mostafa et al. ............... 455/130 |
| 2003/0070027 A1 * | 4/2003 | Ng ............................... 710/305 |
| 2005/0130588 A1 * | 6/2005 | Pratt et al. .................... 455/11.1 |
| 2008/0225930 A1 * | 9/2008 | Proctor et al. ................ 375/214 |
| 2012/0106599 A1 * | 5/2012 | Choi et al. .................... 375/211 |

* cited by examiner

SIGNAL REPEATER AND METHOD FOR MATCHING AN OUTPUT IMPEDANCE OF THE SIGNAL REPEATER, WHICH AMPLIFIES A SIGNAL ON AN ELECTRICAL LINE OF AN ELECTRICAL GRID, TO AN IMPEDANCE OF A LOAD

CROSS-REFERENCE TO RELATED APPLICATIONS

The present disclosure is a continuation of U.S. patent application Ser. No. 12/666,646 filed on Mar. 13, 2012. This application is a National Stage of International Application No. PCT/ES/2008/000417, filed on Jun. 10, 2008. The entire disclosures of the applications referenced above are incorporated herein by reference.

FIELD

The present disclosure relates to as expressed in the title of this specification, the present disclosure relates to a signal repetition system for any communication system using a physical medium as a communications channel, with the characteristic that it is not necessary to interrupt the physical medium to introduce a repetition device, but rather it can be connected in parallel maintaining the advantages of repeating the signal, i.e., reaching greater coverage and greater transmission capacity. Specifically, this device is suitable for communications on the electrical network, in which interrupting the electric line to place a signal repeater is not a possibility in most environments. The implementations disclosed herein increase range and transmission capacity of communication signals without cutting the communications channel to insert the repeater device.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Communication systems can generally be divided into communication systems through the aerial medium (wireless communication systems) or through a conducted medium.

In both types of systems, due to the inherent losses of both media, the transmitted signal will gradually be attenuated until it passes below the sensitivity threshold of the possible receivers, whereby, at a certain distance, the communication will be interrupted.

To increase the range, or to improve the transmission capacity in general, it is necessary to include signal repeaters or regenerators. If the communication is performed through the aerial medium, the situation of the repeater is not especially problematic. In contrast, if the communication medium is conducted, it is likely that the repeater has to be placed inside the medium, interrupting the communications line. In many cases this cannot be performed due to the type of communications channel used (such as for example, the electrical network).

The present disclosure shows a conducted signal repeater, increasing the range and transmission capacity of any communications system, without needing to cut or interrupt the conducted medium.

In the state of the art there are some patents with related concepts but which do not affect the novelty or the inventive step of the present disclosure. For example, patent U.S. Pat. No. 6,598,232B1 entitled "Hybrid amplifier-regenerator for optimizing cable network transmissions" discloses an amplification process, but for which it performs a 2-to-4 wire conversion at both ends of the regenerator device and amplifies each transmission direction separately in a digital manner. The present disclosure proposes an alternative system in which the interruption of the channel or an independent amplification of each direction is not necessary, whereby the necessary hardware and therefore the final cost is simplified.

Another example is patent U.S. Pat. No. 3,9730,89A1 entitled "Adaptive hybrid circuit", which describes a 2-to-4 wire converter with an active hybrid made with tapped 10 delay line filter. As already occurred with the previous reference, the use of a 2-to-4 wire converter involves opening the channel to insert two of these devices facing one another to perform the function of a two-way repeater, something which is not necessary with the device of the present disclosure, in which it is only necessary to have access to a point of the' channel without needing to interrupt the transmission medium.

SUMMARY

A signal repeater is provided and includes a port, an amplifier, and an adaptive device. The port is configured to connect to an electrical line of an electrical grid between multiple devices. Communication over the electrical line and between the devices includes transmission of a first signal. The port is configured to receive the first signal from the electrical line. An amplifier is configured to (i) receive a second signal based on the first signal, and (ii) amplify the second signal. The port is configured to (i) receive the amplified second signal, and (ii) provide the amplified second signal to the electrical line. An adaptive device is configured to, based on the first signal, adjust an output impedance of the signal repeater to match a first impedance of a load on the signal repeater. The first impedance is seen by the signal repeater at the port, where the first impedance includes an impedance of the electrical line.

In other features, a method is provided and includes connecting a port of a signal repeater to an electrical line of an electrical grid between devices. Communication over the electrical line and between the devices includes transmission of a first signal. At the port, the first signal from the electrical line is received. Based on the first signal, a second signal is amplified via an amplifier. The amplified second signal is received at the port. The amplified second signal is provided to the electrical line via the port. Based on the first signal, an output impedance of the signal repeater is adjusted to match a first impedance of a load on the signal repeater. The first impedance is seen by the signal repeater at the port. The first impedance includes an impedance of the electrical line.

To achieve the objectives and prevent the drawbacks indicated in previous sections, the implementations disclosed herein consist of a single-port signal repeater, which is placed parallel to the communications medium without needing to interrupt the communications channel, accessing the medium by means of a single access point, and which includes a hybrid circuit, with a two-way port which is connected to the communications channel, an input port and an output port, in which the input port and output port are isolated; and an amplifier, the output of which is connected to the input port of the hybrid circuit and the input of which is connected to the output port of the hybrid circuit.

In order for the operation of the signal repeater to be optimal, it is necessary for the hybrid circuit to be adapted to the impedance of the communications channel in the access point, such that signal gain without oscillation is obtained.

Depending on whether it is known which is the impedance seen by the repeater in the access point to the channel, the adaptation of the hybrid circuit will be fixed by design or must be adaptable. If the impedance of the communications channel in the access point is fixed and known, the hybrid circuit is designed adapted to the known fixed impedance. In contrast, if the impedance of the communications channel in the access point is unknown beforehand, an adaptive hybrid circuit is used for adapting to the unknown impedance.

An implementation of the adaptive hybrid circuit would consist of an adder/subtractor circuit in which the positive input is the signal of the communications channel and the negative input is the output of the adaptive filter; an impedance connecting tie output of the amplifier with the access point to the communications channel; aid an adaptive filter the input of which is the amplifier output, and the output of which is the negative input of the adder/subtractor circuit; and a feedback of the output of the adder/subtractor circuit to the input of the amplifier of the single-port signal repeater. As a result, a controlled signal gain is achieved after adapting the filter to the transfer function between the output of the amplifier and the access point to the communications channel.

The adaptive filter forming the core of the adaptive hybrid circuit can be implemented in several ways, among them, by means of a digital finite impulse response (FIR) filter or by means of an analog finite impulse response (FIR) filter. In any of the previous cases, using an analog or digital FIR, it is necessary to adjust the response of the filter, something which can be performed by applying a gradient algorithm.

Before putting into operation the analog single-port repeater with an adaptive hybrid circuit, it is necessary to perform an initial adaptation to the channel. This can be performed by following the following steps: disconnecting the feedback, leaving the system in open loop; injecting a signal into the amplifier with spectral content in the bandwidth used in the communications channel; performing the adaptation of the open-loop hybrid circuit with the injected signal maximizing its isolation; and finally closing the loop again for the normal operation as a repeater device.

It is usually not possible to connect the analog single-port repeater directly to the access point to the communications channel, but rather a transmission line must be used to connect tie repeater to the access point. In this case, the response of the transmission line must be taken into account in the repetition process. If the repeater is connected to the communications channel through a known response transmission line, a compensation in the feedback loop between the output of the hybrid circuit and the input of the amplifier is added to the repeater.

In contrast, if the repeater is connected to the communications channel through an unknown response transmission line, a delay between the unknown response transmission line aid the two-way port of the hybrid circuit is added to the repeater, or the delay is added inside the feedback loop of the repeater device. I Another possibility in the event that the repeater is connected to the communications channel through an unknown response transmission line is that a compensation is added in the feedback loop between the output of the hybrid circuit and the input of the amplifier the value of which is adjusted according to the signal received by one or more of the nodes of the communications channel.

The compensation of the repeated signal can be used either to maximize the signal received in one or more of the nodes of the communications network or to minimize the signal received in the nodes.

Finally, although the single-port signal repeater can be applied to any conducted medium, the special features of the electrical grid, the twisted pair and the coaxial cable make them the suitable communications channels for using the device of the disclosure.

To facilitate a better understanding of this specification and forming an integral part thereof, figures are attached in which the object of the disclosure has been depicted with an illustrative and non-limiting character.

Further areas of applicability of the present disclosure will become apparent from the detailed description, the claims and the drawings. The detailed description and specific examples are intended for purposes of illustration only and are not intended to limit the scope of the disclosure.

DESCRIPTION

An embodiment of the disclosure is described below, making reference to the numbering adopted in the figures.

Figure 1:
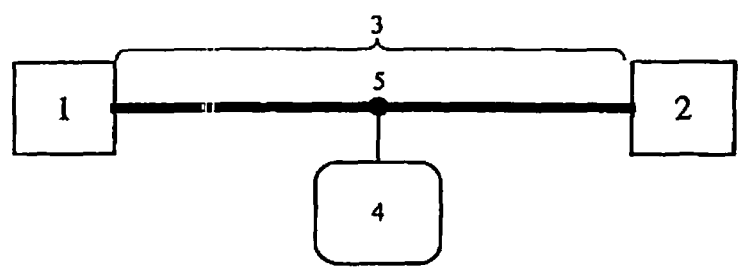
FIG. 1 depicts an example of use of the single-port signal repeater in a communications network made up of two communication nodes.

The problem which the device of the disclosure intends to solve, from a theoretical point of view, consists of designing a circuit which amplifies the signal traveling through a communications channel without needing to interrupt the channel. FIG. 1 shows a typical case in which there are two communication nodes, a transmitter (1) and a receiver (2) connected through a communications channel (3). The device (4) of the disclosure is connected at an access point (5) to the channel (3) to achieve the signal repetition effect.

Figure 2:
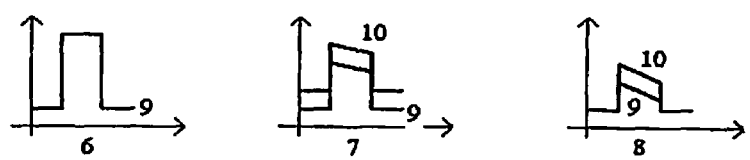
FIG. 2 shows several graphs of the result obtained before and after the inclusion of the single-port signal repeater.

FIG. 2 shows three graphs of signal amplitude in relation to the frequency at different points of the communications channel (3). The graph with reference number (6) shows the signal j at the output of the transmitter node (1). The graph marked as (7) shows the signal at the access point to the channel (5) and the graph marked as (8) shows the signal at the input of the receiver node (2). If the single-port repeater of this indention is not used, the signal traverses the channel (3) and is gradually attenuated according to the depicted levels (9), whereby it is possible that the receiver node (2) is incapable of detecting it as it is lower than its sensitivity threshold. By using the device (4) of the disclosure, the signal would increase to a level (10) which will facilitate its detection in reception.

Figure 3:
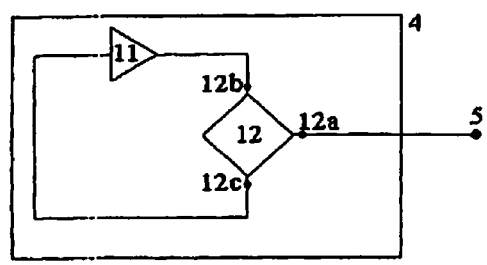
FIG. 3 depicts the generic device of the disclosure, consisting of an amplifier and a hybrid circuit connected in the form of a loop.

The generic diagram of the single-port signal repeater can be observed in FIG. 3. The design consists of an amplifier (11) and a hybrid circuit (12) connected in the form of a feedback loop. The hybrid circuit (12) has three ports, a two-way port (12a, which is connected to the communications channel through the access point (5); an input port (12b), which receives the output signal of the amplifier (11); and an output port (12c), which is connected with the input of the amplifier (11). By specification of the hybrid circuit, there will be a great attenuation between the input port (12b and the output port (12c) of the hybrid circuit (12), whereby the amplified signal would be transmitted through the upper branch; i.e., from the input port (12b to the two-way port (12a; whereas the signal of the 15 channel would be taken through the lower branch; i.e., from the two-way port (12a to the output port (12c).

Due to the fact that a feedback circuit is used to perform the repetition process, it is possible that the device (4) oscillates. To prevent it, it is necessary for the hybrid circuit to be adapted to the same impedance which can be observed 20 "towards the channel from the access point (5) to the channel (3).

If the impedance at the access point (5) is known, the hybrid circuit (12) can be adapted in the design phase to have the suitable-value. If the impedance is not known, it is necessary to use an adaptive hybrid circuit (12) and perform an initial adaptation to achieve the desired effect.

Figure 4:
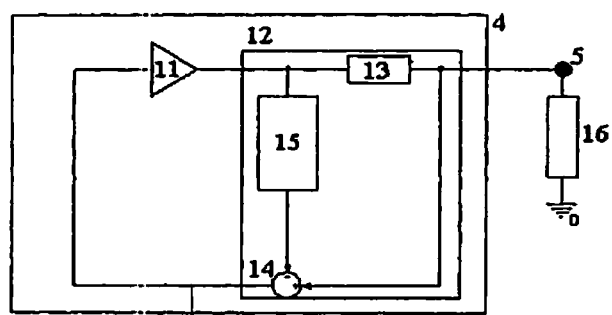
FIG. 4 shows an alternative implementation in which the adaptive hybrid circuit consists of an impedance, an adder/subtractor circuit and an adaptive filter.

FIG. 4 shows an implementation example in which the adaptive hybrid circuit (12) consists of an adder/subtractor circuit (14), an adaptive filter (15) and a fixed-value impedance (13). The positive input of the adder/subtractor circuit (14) is connected to the access point (5) to the channel (3) whereas the negative input is connected to the output of the adaptive filter (15). The output of the 30 adder/subtractor circuit (14) is introduced as an input to the amplifier (11) of the repeater (4) and its output is connected to the input of the adaptive filter (15) and to the communications channel (3) through the fixed impedance (13). The impedance that would be seen by the repeater through the access point (5) is represented by the impedance (16).

Figure 5:
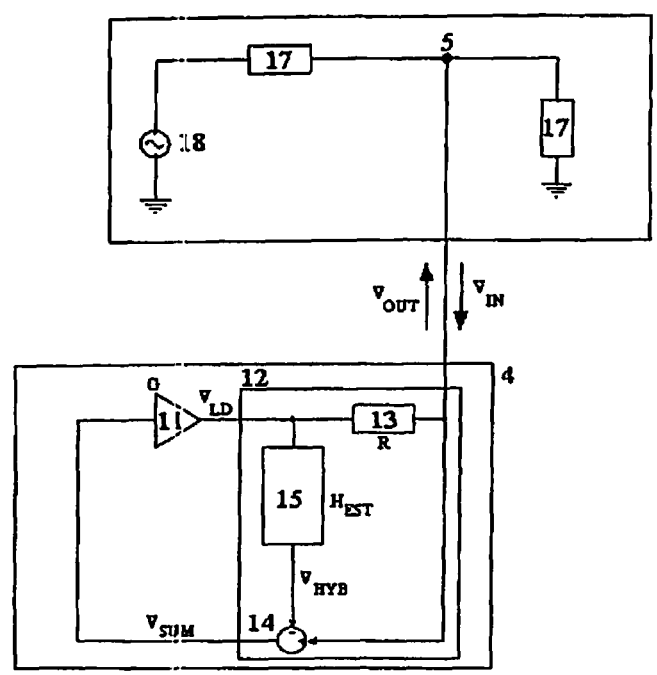
FIG. 5 depicts the device of the previous figure together with a depiction of the theoretical equivalent circuit of the signal in the access point for performing the theoretical calculation of the repetition effect.

FIG. 5 shows a basic diagram with a depiction of the theoretical equivalent circuit of the channel (3) (signal and impedance) at the access point (5).

To perform the theoretical development, the effect of the communications channel (3) at the access point (5) (voltage, $V_{in}$, and an impedance, $Z_L$) has been depicted with a signal generator (18) the voltage value of which is twice the voltage at the access point ($2*V_{in}$) and two resistive divider impedances (17) with twice the impedance of the communications channel ($2*Z_L$) and which is initially unknown. This value $Z_L$ coincides with the value of the impedance (16) of FIG. 4.

In this embodiment of the device of the disclosure, the repeater (4) has been particularized in several aspects. The amplifier (11) has a frequency-dependent 10 transfer function G, the fixed impedance (13) consists of an adaptation resistance with a value R, and the transfer function of the adaptive filter (15) is named as $H_{est}$.

The amplifier (11) attempts to amplify the input signal which is initially in the communications channel without oscillations due to the feedback of the circuit occurring. To that end, it must cancel the transmission signal which is fed back towards the reception of the amplifier (11) as much as possible, allowing the feedback without canceling the desired reception signal If the impedance of the communications channel (3) were maintained constantly (both in time and in frequency) in the value R, the hybrid circuit would only consist of a simple resistive circuit. But since the impedance of the channel ($Z_L$) is unknown, the hybrid circuit needs a filter with a configurable transfer function $H_{est}$, in order to remain adapted at all times to the impedance of the channel and thus achieve the maximum cancellation of the transmission signal.

This effect of the circuit can be described by means of the equations controlling its operation. By means of such equations it is possible to obtain the ratio of the output voltage according to the original voltage existing in the line which, if it is positive, will represent the amplification effect of the device of disclosure.

$$V_{LD} = V_{SUM} \cdot G \tag{Eq.1}$$

$$V_{SUM} = V_{OUT} - V_{HYB} \tag{Eq.2}$$

$$V_{HYB} = V_{LD} \cdot est \tag{Eq.3}$$

By Superimposition:

$$V_{OUT} = 2 \cdot V_{IN} \cdot X_1 + V_{LD} \cdot X_2 \tag{Eq.4}$$

Where:

$$X_2 = \frac{Z_L}{Z_L + R} = H_f \text{ and}$$

$$X_1 = \frac{R \| 2 \cdot Z_L}{R \| 2 \cdot Z_L + 2 \cdot Z_L} = \frac{1}{2} \cdot \frac{R}{Z_L} \cdot \frac{Z_L}{Z_L + R} = \frac{1}{2} \cdot \frac{R}{Z_L} \cdot H_f$$

Substituting $X_1$, and $X_2$ and (Eq. 1), (Eq.2) and (Eq.3) into equation (Eq.4):

$$V_{OUT} = V_{IN} \cdot \frac{R}{Z_L} \cdot H_f + V_{LD} \cdot H_f \tag{Eq. 5}$$

-continued $$V_{OUT} = V_{IN} \cdot \frac{R}{Z_L} \cdot H_f + (V_{OUT} - V_{LD} \cdot H_{est}) \cdot G \cdot H_f \quad \text{(Eq. 6)}$$

To obtain $V_{out}$ as a function of $V_{IN}$, $V_{LD}$ must be isolated from the equation (Eq. 5) and substituted into (Eq.6):

$$V_{LD} = \frac{V_{OUT}}{H_f} - V_{IN} \cdot \frac{R}{Z_L}$$

$$V_{OUT} = V_{IN} \cdot \frac{R}{Z_L} \cdot H_f + \left[ V_{OUT} - \left( \frac{V_{OUT}}{H_f} - V_{IN} \cdot \frac{R}{Z_L} \right) \cdot H_{est} \right] \cdot G \cdot H_f$$

$$V_{OUT} = V_{IN} \cdot \frac{R}{Z_L} \cdot H_f \cdot (1 + G \cdot H_{est}) + V_{OUT} \cdot G \cdot (H_f - H_{est}) \quad \text{(Eq. 7)}$$

$$V_{OUT} = \frac{V_{IN} \cdot \frac{R}{Z_L} \cdot H_f \cdot (1 + G \cdot H_{est})}{1 - G \cdot (H_f - H_{est})} \quad \text{(Eq. 8)}$$

This output voltage is generally the input voltage multiplied by an amplification factor. If an adaption of the function of the signal canceler and of the adaption resistance is performed, the desired effect will be achieved with the device of the disclosure. In the adaption conditions $H_{est}=H_f$:

$$V_{OUT} = V_{IN} \cdot \frac{R}{Z_L} \cdot H_f \cdot (1 + G \cdot H_f)$$

In furthermore, $Z_L=R$:

$$V_{OUT} = V_{IN} \cdot \left( \frac{1}{2} + \frac{G}{4} \right)$$

Thus, with the given conditions, the amplification of the input voltage at the access point (5) by a factor directly proportional to the gain of the amplifier (11) used in FIG. 5 is thus obtained.

To achieve that this circuit does not oscillate, it is necessary to adapt the adaptive filter (15), i.e., to find the coefficients the filter with which the desired output signal is obtained. To that end, any of the gradient algorithms can be used. For example, the LMS (least mean squares) algorithm is particularly suitable since its computational load is low.

The gradient is generally estimated with the error signal and the input signal, therefore the form of updating the coefficients or weights of the filter 15 correspond to the expression:

$$W[N+1]=W[n]+2\mu\, e[n]x[n]$$

Where W are the weights of the adaptive filter, e is the error signal, X is the input signal and μ is the adaptation parameter.

Figure 6:
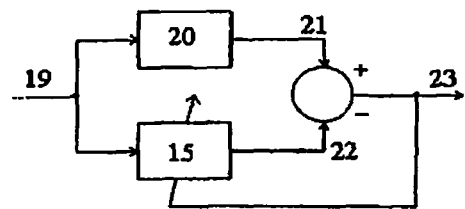
FIG. 6 shows the form of identification of systems by means of a gradient algorithm which can be used in the device for the adaptation of the filter in the adaptive hybrid circuit.

The LMS algorithm allows using it for the identification of linear systems, such that the adaptive filter (15) will be adapted so that it has the desired response (determined by the impedance of the channel at the access point). The general diagram of identification of systems with LMS can be observed in FIG. 6, in which input signal x[n] (19) would be the input signal to the adaptive filter (15) and to the system (20) to which the adaptation is to be performed, which in this case is the response between the output of the amplifier (11) and the access point (5) to the communications channel (3). The outputs of both d(n] (21) and y[n] (22) are subtracted, generating an error signal e[n]=d[n]−y[n] (23) the value of which will modify the adaptive filter (15) until reaching an minimum error signal, in which case the adaptive filter (15) will have a response close to the desired one.

There are two basic forms of implementing the adaptive filter: digital form or analog form. To use a digital filter it is necessary to convert the signal from the analog domain to the digital domain, perform the filtering and return to the digital domain. To that end, analog-to-digital and digital-to-analog converters will be used, as can be observed in the implementation example of FIG. 7.

Figure 7:
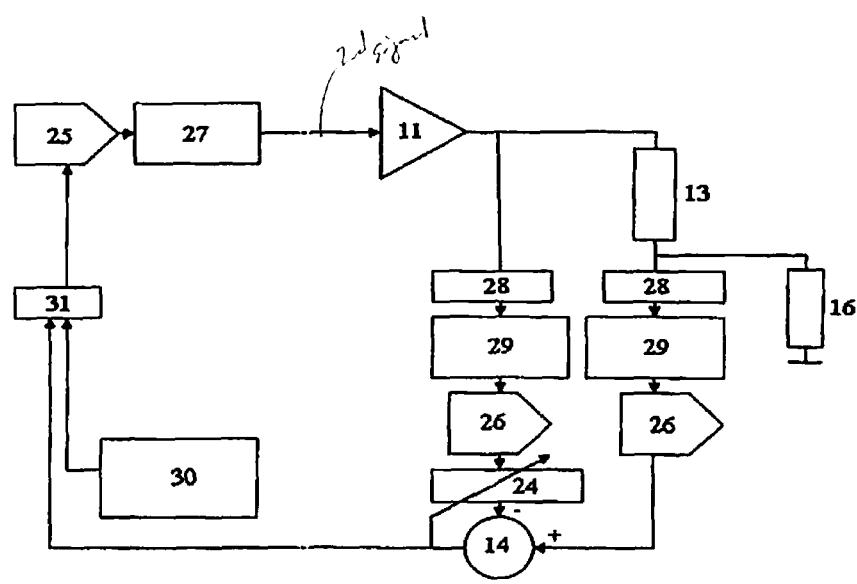
FIG. 7 depicts an alternative implementation of the device of the disclosure by means of digital filtering

In this FIG. 7, the adaptive filter (15) is substituted with an attenuator (28), an antialiasing filter (29), a digital-to-analog converter (26) and the adaptive digital finite impulse response (FIR) filter (24), the coefficients of which are calculated from the error signal, which is the output of the adder/subtractor (14). The signal coming from the communications channel is also passed through an attenuator (28), an antialiasing filter (29) and an analog-to-digital converter (26), after which it is introduced as a positive input to the adder/subtractor (14). A difference between this implementation and the generic one is that a training sequence generator (30) and a multiplexer (31), a digital-to-analog converter (25) and a smoothing filter (27) before the amplifier (11) have been included. These circuits on one hand allow passing from the digital domain to the analog domain and on the other hand serve to perform the initial adaptation of the filter.

Figure 8:
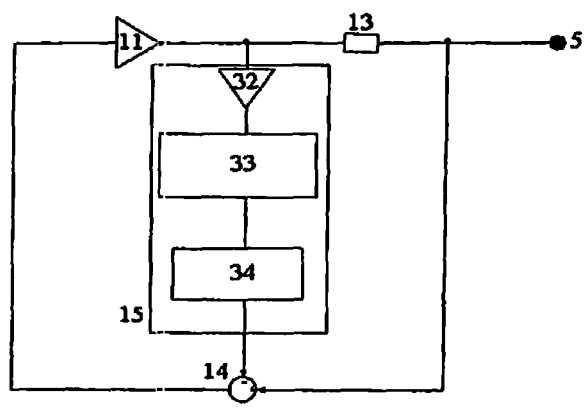
FIG. 8 shows an embodiment of the device of disclosure by means of analog filtering.

FIG. 8 shows another implementation of the device of the disclosure, this time using an analog filter. In this case, since a change of domain is not necessary, the filter only consists of a programmable gain amplifier (32) or PGA, the analog finite impulse response filter (33) and a variable attenuator (34).

If an adaptive hybrid circuit is used, before using the single-port signal repeater it is necessary to adapt it to the impedance of the communications channel at the access point. To that end, the device must be connected to the communications channel in conditions of open loop, and the adaptation must be performed in moments of silence.

Once the adaptation is achieved, the loop is closed again. If this process is not performed, the feedback of the circuit will probably cause an oscillation of the repeater.

Figure 9:
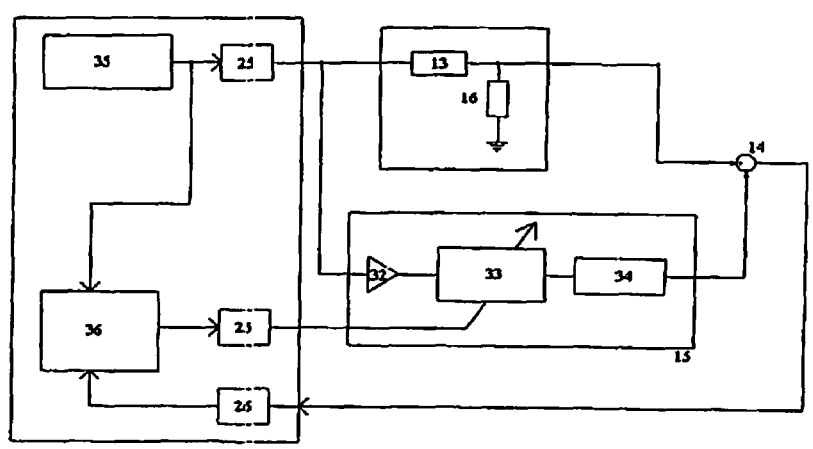
FIG. 9 schematically depicts the adaptation process of the open-loop circuit before putting it into operation in a real communications environment.

An embodiment of the adaptation process can be observed in FIG. 9. In this case the signal used for the adaptation is a white noise with spectral content wide enough to cover the work band of the repeater device.

The output signal of the white noise generator (35) is converted to the analog domain by means of a converter (25) and the signal is injected both into the adaptive filter (15) through the programmable gain amplifier (32) and into the communications channel (3) through the fixed impedance (13). This signal is also introduced in a circuit (36) which performs the calculation of coefficients by means of the LMS algorithm, for which it also needs the output signal of the adder/subtractor (14) transformed to the digital domain by means of the converter (26). The calculated coefficients (w[n]) are transferred to the analog domain by means of a converter (25) and are introduced in the analog FIR filter (33) (or if the filter is digital, as coefficients of the digital FIR filter without needing the conversion process).

According to the simulation, it is necessary for the white noise signal to be at least 26 dBs above the line noise signal so that the adaptation process operates suitably. The time necessary for the adaptation will depend mainly on the number of coefficients used and on the adaptation algorithm chosen. For the LMS algorithm and twenty coefficients, a time between 1 and 15 microseconds according to the simulation is needed.

Figure 10:
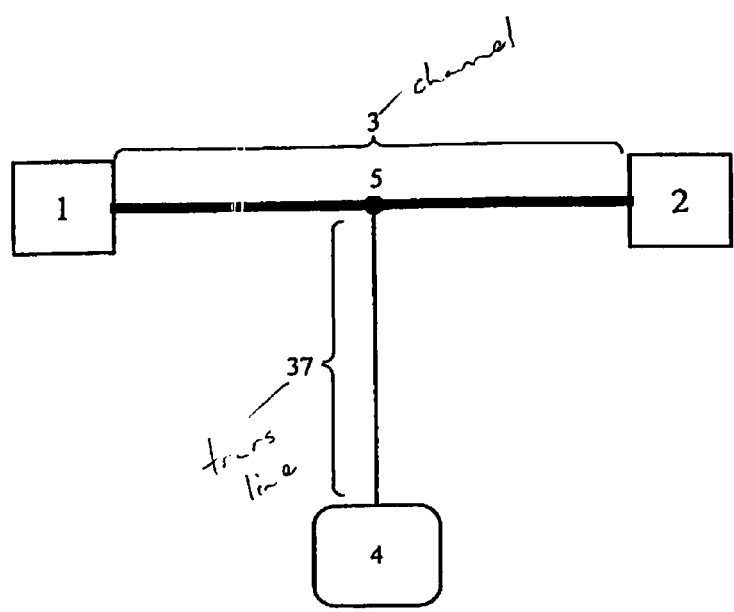
FIG. 10 shows the connection of the single-port repeater through a transmission line.

For the generic application of the device of the disclosure, it has been supposed that the connection of the single-port signal repeater (4) to the communications channel (3) is carried out directly at the access point (5) to the channel (3). Depending on the topology of the network, in real cases it will be difficult to carry out this connection directly, and it will be necessary to use a transmission line (37) between the output of the repeater (4) and the access point (5) to the channel (3) to perform the connection. This case has been depicted in FIG. 10 in which the single-port signal repeater (4) is connected to the access point (5) through a transmission line (37) with a generic length L.

Figure 11:
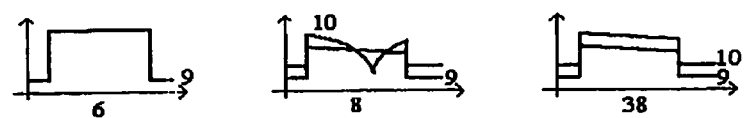
FIG. 11 shows the effect, caused by using a transmission line for connecting the single-port signal repeater, on the signal at different points of the communications channel.

FIG. 11 shows the amplitude values according to the frequency at different points of the system in the event that the repeater (4) is connected through a transmission line (37). Graph (6) shows the signal at the output of the transmitter node (1). Graphs (8) and (38) show the signal at the input of the receiver node (2). In the former (8), no compensation of the effect of the transmission line (37) has been performed, whereas in the latter (38) the effect of the line in the feedback loop of the single-port signal repeater has been compensated. As in previous graphs, the signal at the different points is indicated if the single-port signal repeater is not applied (9) and if it is applied (10).

Figure 12:
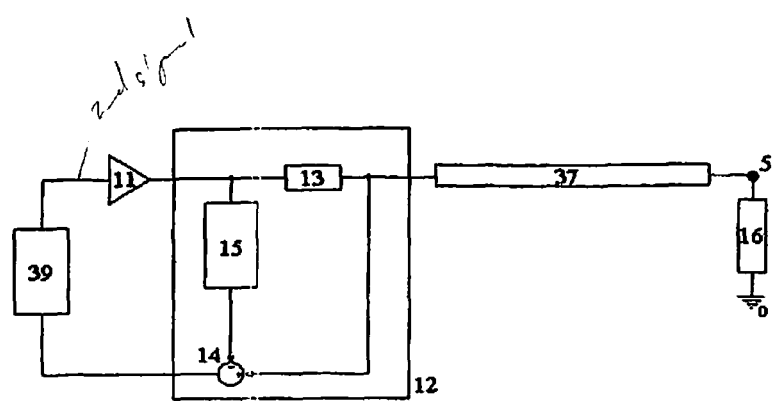
FIG. 12 depicts the device of the disclosure with a compensator of the effect of the transmission link in the fed-back loop.

As can be observed, if it is not suitably compensated, the transmission line (37) modifies the amplitude of the signal according to the frequency. If the transmission line (37) has a known transfer function, it is possible to compensate the effect in this feedback loop of the repeater. FIG. 12 shows an embodiment in which a compensating block (39) has been included with a response such that it compensates the effect of the transmission line (37) connecting the single-port signal repeater to the access point (5) to the channel (3).

Figure 13:
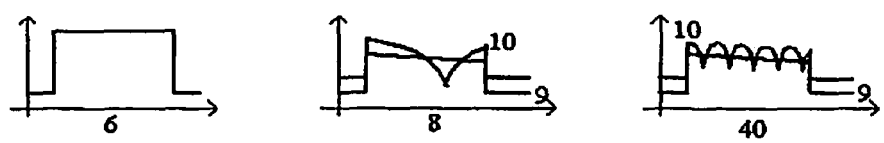
FIG. 13 shows the effect on the signal when the device of the disclosure connected by an unknown transmission to the communications channel is used, and the signal received when a delayer is included in the device of the disclosure.

If the transmission line (37) has an unknown transfer function, a possible solution is to generate an additional phase shift in the repeater itself with an order of magnitude greater than that introduced by the transmission line (37). The delay can be placed inside the feedback loop or outside the loop. FIG. 13 shows the signal at different points of the system for the case of using the repeater with an additional delay. Graph (6) shows the signal at the output of the transmitter node whereas graphs (8) and (40) show the signal at the input of the receiver node (2) without using the delay, in the case of graph (8), and using the delay, in the case of graph (40). As in previous cases, the level with reference number (9) refers to the signal without applying the single-port signal repeater, whereas the level with reference number (10) indicates the signal level if the single-port signal repeater is applied.

The value of the delay must be high compared to that of the line (37) so that the predominant effect is that of the added delay. Thus, a ripple effect will be achieved with peaks (constrictive effect) and valleys (destructive effect), and the effect on average, in the input of the receiver node (2), will be a positive signal gain, as can be seen upon comparing the values of the signal received without repeater (9) and placing the repeater (10) which in this case includes the delay.

Figure 14:
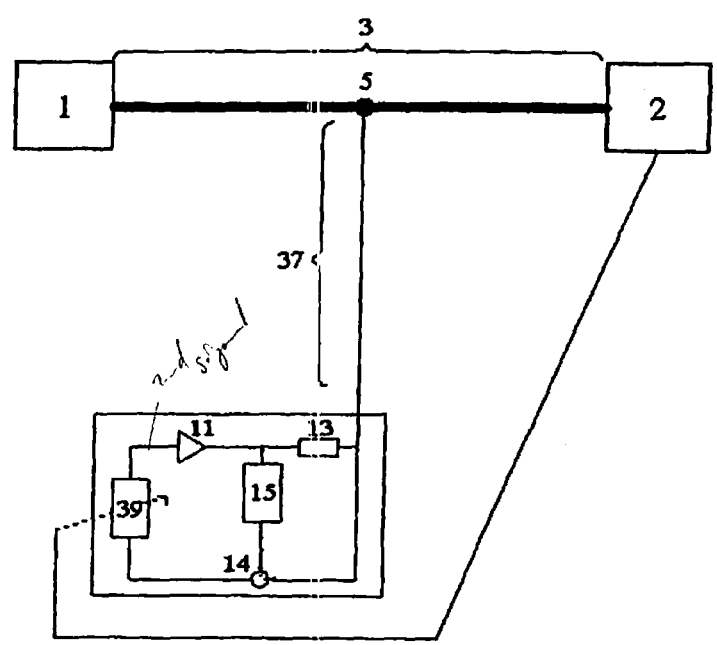
FIG. 14 shows an embodiment in which the coefficients of the compensator are calculated with the information of the receiver node such that the signal is maximized at the input of the receiver node.

Up until now an autonomous system, without any feedback of information from the transmitter node (1) and receiver node (2), has been described. Having information of the communication made, it is possible to adjust the single-port signal repeater in an optimal manner to achieve maximizing the repetition effect that the device can reach. This example can be observed in FIG. 14, which the receiver node (2) sends information about its communication to the repeater (4) such that the latter adjusts the compensator (39) until the input signal to the receiver node (2) is optimal.

Figure 15:
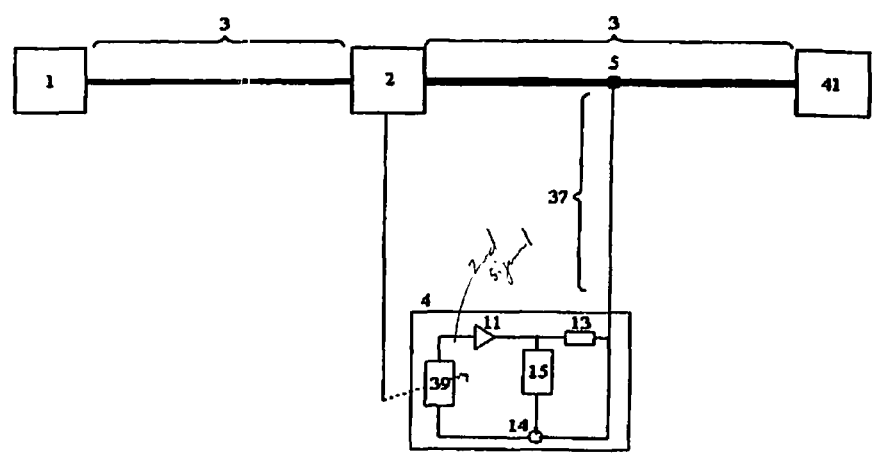
FIG. 15 shows an embodiment in the event that the signal coming from the communications nodes of a neighboring network is to be minimized, adjusting the coefficients of the compensator of the loop of the single-port signal repeater.

In some cases, it is interesting for the signal repetition to be useful for achieving that the signal at the input of the receiver node (2) is minimal (for example, to minimize the interference of signals coming from neighboring networks). In this case, which can be observed in FIG. 15, the compensator (39) is adjusted with the information received from the receiver node (2) until achieving the minimum in the input signal to the node of the neighboring network (39).

What is claimed is:

1. A signal repeater comprising:
a port configured to connect to an electrical line of an electrical grid between a plurality of devices, wherein communication over the electrical line and between the plurality of devices includes transmission of a first signal, and wherein the port is configured to receive the first signal from the electrical line;
an amplifier configured to (i) receive a second signal based on the first signal, and (ii) amplify the second signal, wherein the port is configured to (i) receive the amplified second signal, and (ii) provide the amplified second signal to the electrical line; and
an adaptive device configured to, based on the first signal, adjust an output impedance of the signal repeater to match a first impedance of a load on the signal repeater, wherein the first impedance is seen by the signal repeater at the port, and wherein the first impedance includes an impedance of the electrical line.

2. The signal repeater of claim 1, further comprising a subtractor configured to generate an output based on the first signal and an output of the adaptive device, wherein the adaptive device is configured to generate the output of the adaptive device based on the amplified second signal.

3. The signal repeater of claim 2, further comprising:
a generator configured to generate a digital sequence;
a multiplexer configured to (i) receive the output of the subtractor and the digital sequence, and (ii) output the output of the subtractor or the digital sequence;
a digital-to-analog converter configured to convert the output of the multiplexer to an analog signal; and
a filter configured to filter the analog signal to generate the second signal.

4. The signal repeater of claim 1, wherein the adaptive device is configured to isolate an output of the adaptive device from an output of the amplifier.

5. The signal repeater of claim 1, further comprising a second impedance connected (i) between the port and the amplifier, and (ii) between the port and the adaptive device, wherein the port is configured to receive the amplified second signal via the second impedance.

6. The signal repeater of claim 1, wherein the adaptive device comprises:
a first antenuator configured to attenuate the first signal;
a first filter configured to anti-alias filter an output of the first antenuator;
a first analog-to-digital converter configured to convert an output of the first filter to generate a digital signal; and
a subtractor configured to generate an output based on the digital signal,
wherein the second signal includes the output of the subtractor or is generated based on the output of the subtractor.

7. The signal repeater of claim 6, further comprising:
a second attenuator configured to attenuate the amplified second signal;
a second filter configured to anti-alias filter an output of the second attenuator;

a second analog-to-digital converter configured to convert an output of the second filter to generate a digital signal; and a third filter configured to filter the digital signal generated by the second analog-to-digital converter, wherein the subtractor is configured to subtract an output of the third filter from the digital signal generated by the first analog-to-digital converter to generate the output of the subtractor.

8. The signal repeater of claim 7, further comprising:

a generator configured to generate a digital sequence;

a multiplexer configured to (i) receive the second signal and the digital sequence, and (ii) output the second signal or the digital sequence;

a digital-to-analog converter configured to convert the output of the multiplexer to an analog signal; and a fourth filter configured to filter the analog signal to generate the second signal.

9. The signal repeater of claim 1, further comprising a compensator connected between the adaptive device and the amplifier, wherein:

the compensator is configured to adjust the second signal to compensate for affects of a transmission line on the first signal; and the port is connected to the electrical line via the transmission line.

10. The signal repeater of claim 9, wherein:

the compensator is configured to (i) receive a signal from a first device, and (ii) adjust the second signal based on the signal received from the first device; and the plurality of devices includes the first device.

11. A method comprising:

connecting a port of a signal repeater to an electrical line of an electrical grid between a plurality of devices, wherein communication over the electrical line and between the plurality of devices includes transmission of a first signal;

receiving, at the port, the first signal from the electrical line;

based on the first signal, amplifying a second signal via an amplifier;

receiving the amplified second signal at the port;

providing the amplified second signal to the electrical line via the port; and based on the first signal, adjusting an output impedance of the signal repeater to match a first impedance of a load on the signal repeater, wherein the first impedance is seen by the signal repeater at the port, and wherein the first impedance includes an impedance of the electrical line.

12. The method of claim 11, further comprising:

generating an output of an adaptive device based on the amplified second signal; and generating a resultant output based on the first signal and the output of the adaptive device.

13. The method of claim 12, further comprising:

generating a digital sequence;

selecting one of the second signal and the digital sequence;

converting the selected one of the resultant output and the digital sequence to an analog signal; and via a filter, filtering the analog signal to generate the second signal.

14. The method of claim 11, further comprising isolating an output of an adaptive device from an output of an amplifier, wherein the adjusting of the output impedance of the signal repeater is performed via the adaptive device.

15. The method of claim 14, further comprising receiving, at the port, the amplified second signal via a second impedance, wherein the second impedance is connected (i) between the port and the amplifier, and (ii) between the port and the adaptive device.

16. The method of claim 14, further comprising:

attenuating the first signal via a first attenuator;

via a first filter, anti-alias filtering on an output of the first attenuator;

converting an output of the first filter to generate a digital signal; and generating a resultant output based on the digital signal, wherein the second signal includes the resultant output or is generated based on the resultant output.

17. The method of claim 16, further comprising:

attenuating the output of the amplifier via a second attenuator;

via a second filter, anti-alias filtering an output of the second attenuator;

converting an output of the second filter to generate a digital signal;

via a third filter, filtering the digital signal generated from converting the output of the second filter; and generating the resultant output based on (i) an output of the third filter, and (ii) the digital signal generated from converting the output of the first filter.

18. The method of claim 17, further comprising:

generating a digital sequence;

selecting one of the second signal and the digital sequence;

converting the selected one of the second signal and the digital sequence to an analog signal; and filtering the analog signal via a fourth filter to generate the second signal.

19. The method of claim 11, further comprising adjusting the second signal to compensate for affects of a transmission line on the first signal, wherein the port is connected to the electrical line via the transmission line.

20. The method of claim 19, further comprising:

receiving a signal from a first device; and adjusting the second signal based on the signal received from the first device, wherein the plurality of devices includes the first device.

* * * * *